United States Patent [19]
Kateley et al.

[11] Patent Number: 5,385,427
[45] Date of Patent: Jan. 31, 1995

[54] METHOD AND APPARATUS FOR CONTAINMENT OF OIL AND OTHER POLLUTANTS

[76] Inventors: Richard D. Kateley, 113 Whispering Woods Hill, Guilford, Conn. 06457; Sloan Danenhower, P.O. Box 432, Old Lyme, Conn. 06371

[21] Appl. No.: 121,995

[22] Filed: Sep. 14, 1993

Related U.S. Application Data

[63] Continuation-in-part of Ser. No. 849,665, Mar. 11, 1992, abandoned.

[51] Int. Cl.6 ............................................. E02B 15/04
[52] U.S. Cl. ........................................ 405/68; 405/60; 405/63
[58] Field of Search ................... 405/60, 61, 63-68, 405/70-72

[56] References Cited

U.S. PATENT DOCUMENTS

| | | | |
|---|---|---|---|
| 3,599,434 | 8/1971 | Missud | 405/68 X |
| 3,984,987 | 10/1976 | Light | 405/63 |
| 4,201,495 | 5/1980 | Preus | 405/63 |
| 4,688,024 | 8/1987 | Gadde | 405/63 X |
| 5,020,940 | 6/1991 | Smith | 405/63 |
| 5,114,273 | 5/1992 | Anderson | 405/60 X |
| 5,154,537 | 10/1992 | DeVries et al. | 405/60 |

FOREIGN PATENT DOCUMENTS

| | | | |
|---|---|---|---|
| 1294889 | 5/1969 | Germany | 405/68 |
| 1634141 | 11/1970 | Germany | 405/68 |

Primary Examiner—Dennis L. Taylor

[57] ABSTRACT

A containment boom has at least a portion of a semi-flexible pipe on which a containment skirt is mounted. The boom is permanently anchored to anchors on the sea bottom. A compressor is connected to pump air into the pipe to render it buoyant, to surround a moored vessel. The boom may be sunk, to permit movement of the vessel by pumping water into the pipe.

15 Claims, 6 Drawing Sheets

METHOD AND APPARATUS FOR CONTAINMENT OF OIL AND OTHER POLLUTANTS

This application is a continuation-in-part of U.S. application Ser. No. 07/849,665 filed Mar. 11, 1992, now abandoned.

FIELD OF THE INVENTION

This invention relates to an improved method for the containment of oil and other pollutants on waters surrounding moored vessels.

BACKGROUND OF THE INVENTION

It is frequently desirable to surround vessels, such as ships and barges, that are moored at a dock or the like, with a containment boom in order to contain oil or other pollutants from the vessel in the area immediately surrounding the vessel. Such booms thereby simplify the task of cleanup in the event of any spillage from the vessel.

One conventional oil containment boom is comprised of a string of floatable billets, for example of styrofoam, having round cross sections. The billets are covered with rubber impregnated ripstop nylon sleeves or vinyl impregnated woven cloth fastened together to make continuous flexible but strong lengths. The diameter of the billets, of for example 12 inches, and the depth of the skirts vary as a function of various factors such as weather conditions, vessel size, etc. A "skirt" portion of the sleeve hangs downward from the submerged portion thereof, the skirt extending downward for a distance of generally one foot to 18 inches below the surface of the water, depending upon the size of the boom. A sleeve of smaller diameter, for example four inches, is provided at the bottom of the skirt, and length of chain or wire rope is threaded through this lower sleeve, running continuously for the length of the boom.

Tankers and barges utilizing ports on the east coast of the United States generally have lengths in the range of 150 feet to 700 feet. Vessels of this size thus require the use of containment booms that have lengths of from 200 feet to 1200 feet. When a vessel is not moored at the dock, the boom is stored at a nearby location, for example behind a standard "T" dock.

After a calling vessel is secured dockside, the boom is conventionally deployed from a storage area using a 16' to 20' open cockpit skiff having, for example, a 50 to 150 H.P. outboard motor. The skiff is employed to tow the boom around the dockside vessel and connect it back on itself, thus forming a circle around the vessel to contain any spillage.

In the deployment of the boom, it is necessary to secure a number of anchors thereto, such as a #15–#35 Danforth style anchors. These anchors are secured at critical points along the boom by the crew in the skiff, to insure that the boom stays from 30 to 50 feet from the off dock side of the vessel.

Most conventional containment booms are of the configuration, with their dimensions depending upon the application, location, dock size, largest expected vessel size, seas, current, water depth, etc. Generally the boom is left floating while not in use, at a location away from the traffic and the dock face, and yet close enough for deployment. Such storage can result in the boom fouling on itself or on pilings.

The process of booming, or deploying and storing the boom, is usually done by a subcontractor or the marine terminal operator whose employer owns the dock and deploys the boom as an added step to his regular duties. In the process of booming, one or more men must man the outboard skiff, to set anchors to secure the boom with sufficient spacing from the side of the ship. Getting into and out of these boats, especially at low water, employing slimy ladders, etc., can and does cause problems and accidents, not to mention fouling of the anchor lines while setting and pulling the anchors.

Elements such as cold weather and darkness frequently make it dangerous to be in the skiff, let alone to simultaneously maneuver 200 to 1200 feet of boom and set anchors with 150 to 200 feet of line each. Many marine terminal operators assigned to handle the booming are not adequately trained in the use of small boats, thereby increasing the risk of accidents.

Other types of floating containment booms are disclosed, for example, in U.S. Pat. No. 4,068,478, Meyers et al; U.S. Pat. No. 4,964,758, Pekelny and U.S. Pat. No. 5,114,273, Anderson. Such booms are subject to problems in deployment, as above discussed, or are adapted to be deployed only directly from the vessel.

Submersible booms are also known, wherein a collapsible tube is connected to a source of air pressure, such that it will float when inflated and sink to the sea floor when deflated. Booms of this type are disclosed, for example, in U.S. Pat. No. 5,064,309, Dickie et al; U.S. Pat. No. 4,573,426, Larsen; U.S. Pat. No. 3,779,020, Muramatsu et al, U.S. Pat. No. 3,859,796, Benson; and U.K. Patent No. 843,131. While containment booms are not generally subject to the above discussed problems of deployment, they are subject to problems in inflation and deflation as a result of the use of collapsible tubing.

SUMMARY OF THE INVENTION

The present invention is therefore directed to a method and apparatus for overcoming the above stated disadvantages and problems involved in the use of conventional booming systems.

Briefly stated, in accordance with the invention, a boom is permanently anchored in position to surround a vessel at the terminal, and is capable of being sunk to permit movement of the vessel, and raised to serve as a containment boom. The boom is comprised at least partly of a length of semi-flexible plastic pipe, such as polyethylene pipe, having a weighted skirt. The boom is permanently anchored, for example with stainless steel cable to anchors such as concrete blocks at the bottom of the harbor. The plastic pipe and surrounding portion of the skirt may have holes on their outboard side to permit the passage of a certain amount of air. In this embodiment of the invention, the boom is raised from the bottom of the harbor by pumping air into the pipe, and is lowered be permitting sea water to flow through the holes into the pipe.

Alternatively, the pipe is not provided with holes, and is adapted to be sunk by the pumping of water, preferably fresh water, into the pipe.

The containment boom in accordance with the invention streamlines the labor intensive task of deploying and retrieving water born oil terminal oil containment booms. The job is made efficient, quick and safe using a land or dock based compressed air supply.

In modifications of the invention, bulkheads may be provided in the boom, in order to enable control over the raising and lowering of the boom.

BRIEF DESCRIPTION OF THE DRAWINGS

In order that the invention may be more clearly understood, it will now be disclosed in greater detail with reference to the accompanying drawing, wherein.

DETAILED DISCLOSURE OF THE PREFERRED EMBODIMENTS

Figure 1:
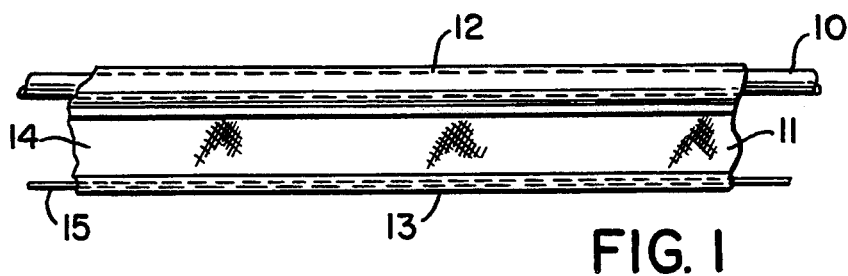
FIG. 1 is a side view of a portion of a containment boom in accordance with the invention.
Figure 2:
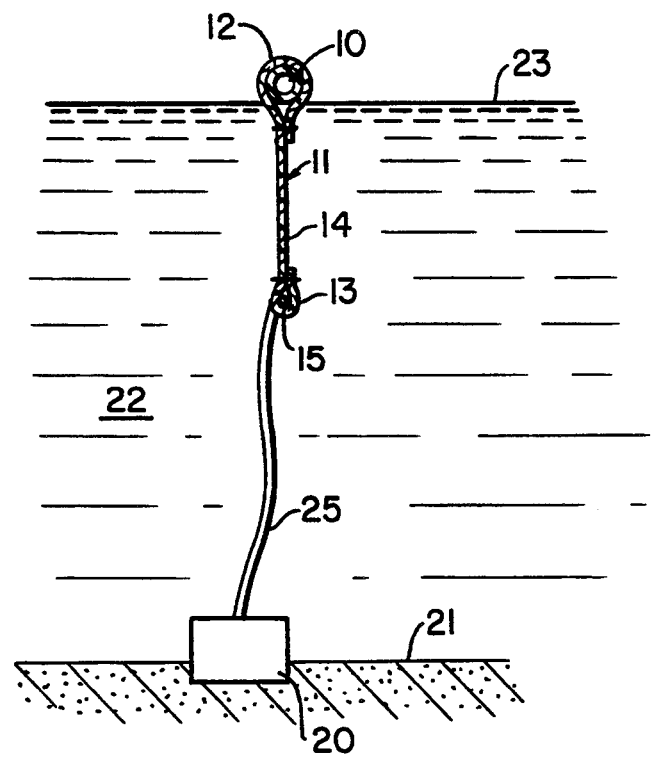
FIG. 2 is a cross sectional view of the boom of FIG. 1.

Referring now to the drawings, and more in particular to FIGS. 1 and 2, a containment boom in accordance with the invention is comprised of a continuous semi-flexible dredge pipe 10. The term "semi-flexible pipe", as used herein, refers to a pipe whose walls are sufficiently rigid that the cross sectional shape of the pipe is at least substantially maintained during use, whether filled with air or water, and that substantially maintains its longitudinal shape between positions at which it is anchored in the boom, even when subjected to wave action, but is still sufficiently flexible that it can bend flexibly sufficiently to enable it to be raised and lowered without damage. In other words, the material of the pipe can flexibly bend without damage from a fixed position on the shore or a pier to a position at which a portion thereof rests on the bottom of the body of water. It is not necessary for the material to be flexible enough for the portion of the pipe resting on the bottom of the body of water pipe to completely conform to the bottom of the body of water upon which it rests, as long as the portion thereof extending from this portion to the fixed position can flexibly bend sufficiently to avoid being damaged by raising and lowering of the boom. A material such as polyethylene has been found to be satisfactory for this purpose. The pipe 10 may have a diameter, for example, of 12 inches, although the invention is not limited to such dimension. As will be discussed in following paragraphs, it is not necessary that the semi-flexible pipe itself completely surround an area to be protected.

A skirt 11, for example of rip stop nylon, has an upper sleeve 12 surrounding the pipe, a lower or ballast sleeve 13, and a central web 14. The web 14 may have a width of, for example, 12 to 18 inches. A chain or wire ballast 15, for example of ¼ inch cable, extends continuously through the sleeve 12.

As illustrated in FIG. 2, a plurality of anchors 20 (only one of which is seen in FIG. 2), for example 500 pound blocks of concrete, rests on the bottom 21 of a body 22 of water, and the pipe 10, when in the buoyant condition, floats on the surface 23 of the body of water. The cable 15 of the boom is held to the anchor 20 by a stainless cable 25. The cable 25 may be a ¼ stainless wire, although a different size cable may be employed. For example, a smaller diameter wire may be used, if desired, if there is a risk that the cable may become wrapped in the ship or tug wheel, the smaller diameter being capable of breaking to avoid damage to the vessel.

The number of anchors that are connected to the boom is dictated by the conditions of the application, such as the length of the boom, current conditions, etc. Shock cords may be coupled to the anchor lines, if desired in order to compensate for surges from the weather.

Figure 3:
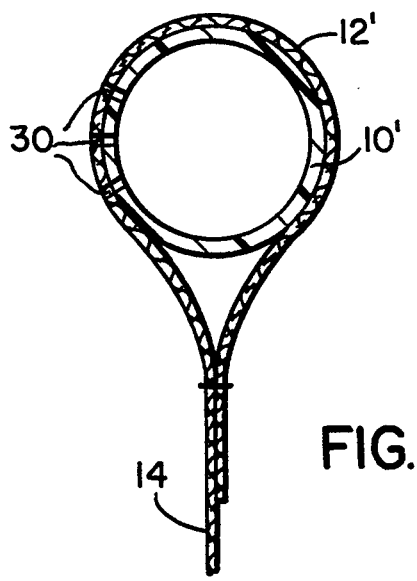
FIG. 3 is an enlarged cross sectional view of a portion of the boom in accordance with one embodiment of the invention.

In one embodiment of the invention, as illustrated in FIG. 3, the pipe 10' and sleeve 12' are provided with selectively drilled and sized holes 30 on the out board side of the skirt (i.e. away from the vessel)—throughout the entire length of the boom. This enables air to escape through the holes at a predetermined rate, without preventing the boom from rising from the river, bay or sea bottom and buoyancy is maintained while the barge or tanker is loading or discharging, as long as air is being supplied from a compressor 40, as illustrated in FIG. 4.

Figure 4:
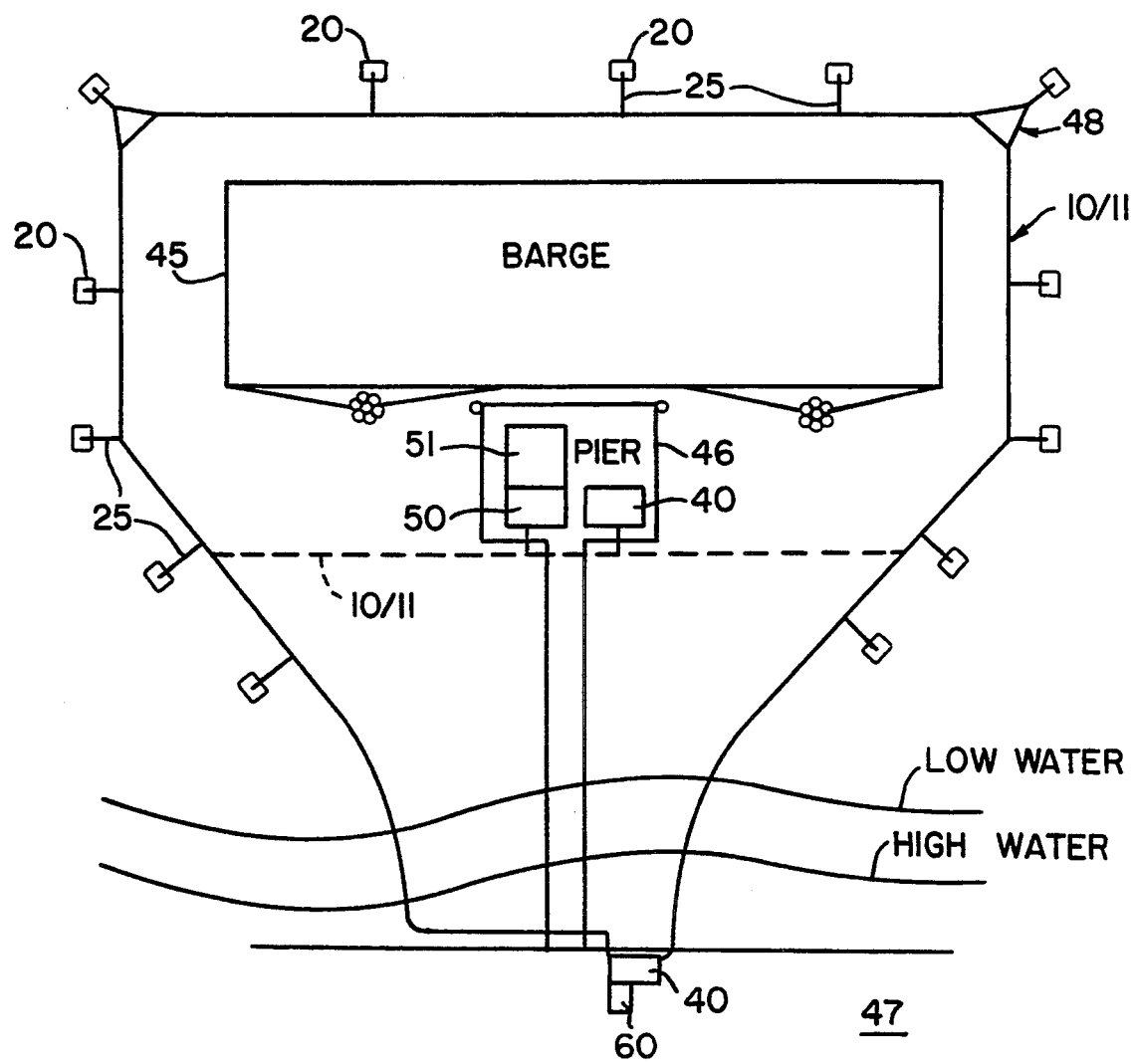
FIG. 4 is a schematic illustration of the manner of use of the boom of FIG. 3.

FIG. 4 illustrates the use of the boom of FIG. 3, as a containment boom surrounding a barge 45 moored at a dock or pier 46. The boom 10/11 is anchored to surround the barge 45, and be spaced therefrom by about 30–40 feet. The positions of the anchors 20 is selected to enable containing the largest vessel expected to moor at the dock. One end or both ends of the boom extends to the compressor 40, which may be located on a pier 46 or dry land 47. The positioning of the boom, for example at corners, may be simplified by the use of corner pendants 48, i.e. cable connected to a common anchor from several points on the boom.

In the use of the boom illustrated in FIG. 3, the compressor is initially turned off, so the sea water can enter the pipe via the holes 30 and sink the boom. The vessel can now enter the dock area and moored, as illustrated in FIG. 4. After the vessel is moored, the compressor is turned on, to inflate the pipe 10. As above discussed, the holes in the pipe 10 are sufficiently small that the pipe will become buoyant, and remain buoyant, as long as the compressor is energized. When the boom reaches the surface of the body of the water, it serves to contain any spillage from the vessel or dock.

When the loading or discharging process is finished, and the vessel is ready to depart, the compressor is secured to permit the air in the boom to be displaced by seawater passing through the holes 30, causing the boom to sink to the water bottom.

Alternatively, the compressor 40 can be located on the pier 46. In this arrangement, instead of extending to the shore, the boom 10/11 extends to the dock or pier for connection to the compressor 40, as illustrated in dashed lines in FIG. 4. The boom may comprise a continuous loop surrounding the pier and vessel and have portions of semi-flexible pipe connected to the compressor and the pump 50.

Figure 5:
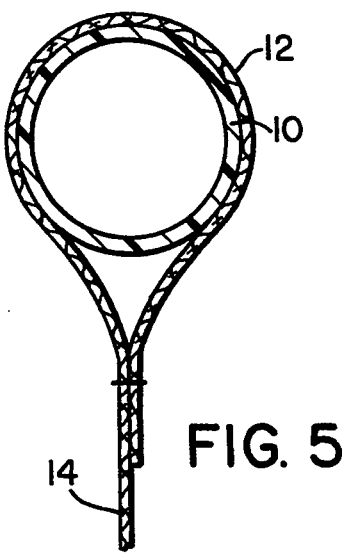
FIG. 5 is an enlarged cross sectional view of a portion of the boom in accordance with another embodiment of the invention.
Figure 6:
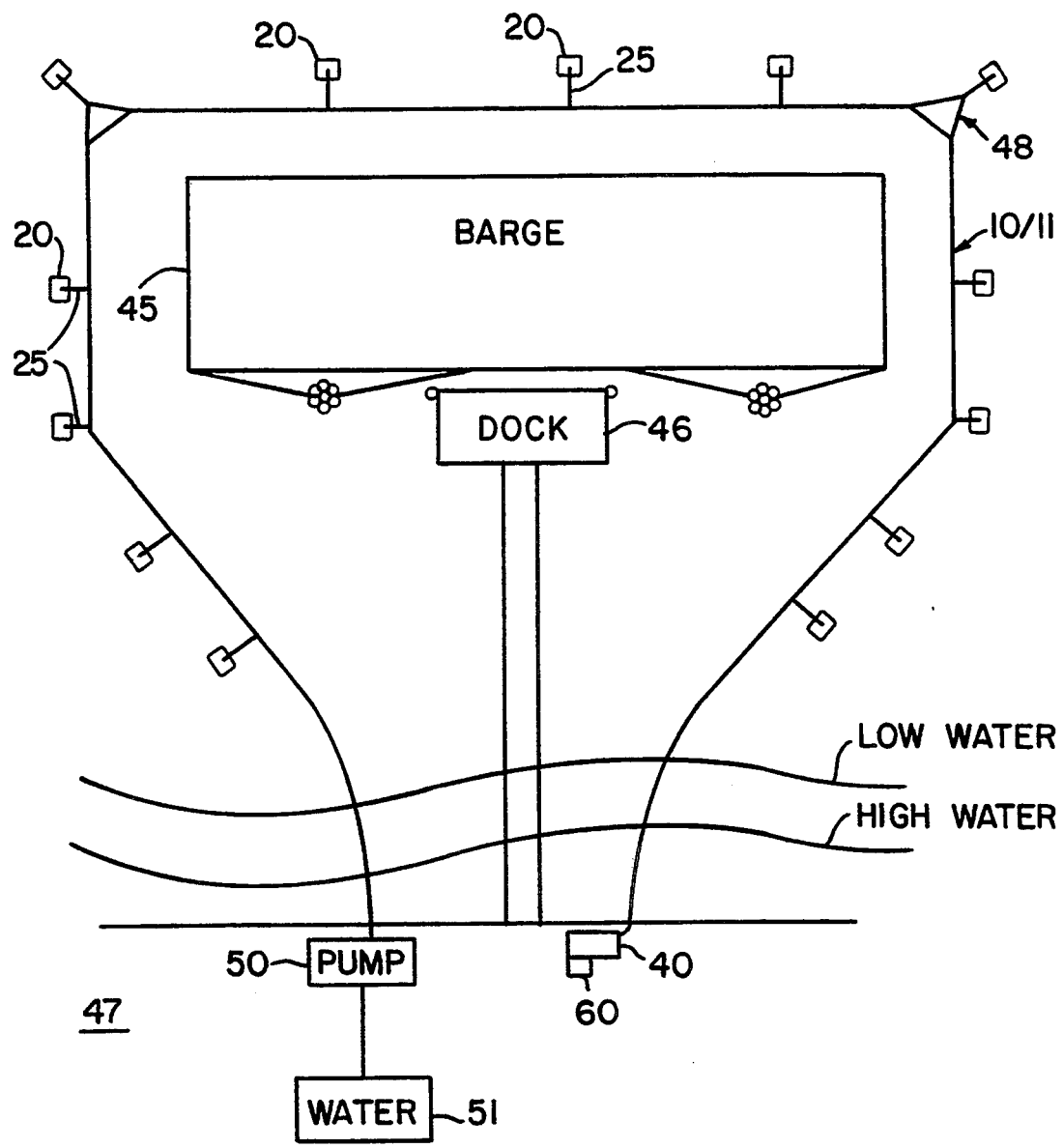
FIG. 6 is a schematic illustration of the manner of use of the boom of FIG. 5.

In an alternative embodiment, as illustrated in FIGS. 5 and 6, the pipe 10 and sleeve is not provided with holes. In this arrangement, one end of the pipe 10 is connected to the compressor 40, and the other end is connected to a source of pressurized fresh water, such as a pump 50 connected to a source 51 of fresh water. It is of course apparent that, alternatively, the fresh water may be directed into the pipe from a conventional water hydrant.

In this embodiment of the invention, fresh water is pumped to the boom pipe 10 when it is desired to sink the boom, and compressed air is pumped to the boom when it is desired to raise it. It is apparent, of course, the compressor and water pump may be connected to enable the selective pumping of air and water to both ends of the pipe.

The arrangement of FIGS. 5 and 6 avoids the danger of plugging of the holes 30 in the pipe, for example by marine growth, mud, etc. The arrangement of FIGS. 3 and 4 has the advantage, however, that escaping bubbles serve to help unbury the pipe, if necessary. In addition, the lack of necessity for employing water to sink the pipe reduces problems that may arise, especially in cold weather.

The invention thereby provides a simple and effective method and apparatus for raising and lowering a containment boom. Each application of the system must be designed on a case by case basis to account for major variables such as, but not limited to, current, depth, wind and sea bottom conditions. Proper buoyancy of the boom is directly related to the diameter of the semi-flexible pipe, so that major changes in the length of the boom may require changes in the diameter of the pipe.

As a deterrent to marine growth such as barnacles, shell fish, etc., a simple atomizing system 60 may be provided at the compressor to enable the introduction of an environmentally friendly defouling solution to atomize into the air. Alternatively, chlorine tablets may be introduced into the pipe to serve this function.

The pipe 10 is preferably of material that has the characteristic that is can be run over, as the case may be, by a deep draft ship or barge rubbing the bottom of the body of water as it enters or leaves the dock area. With such a pipe, the system will continue to function even though the pipe has been squashed and even ruptured. It has been found that this function is satisfactorily achieved by the use of the semi-flexible pipe, in accordance with the invention. As long as the boom can be resurfaced, then a standby repair crew can easily cut out the damaged pipe or skirt section and replace it, since the tube can be fused and the skirt can be either fused or sewn together. The cables can be mended by conventional techniques.

Figure 7:
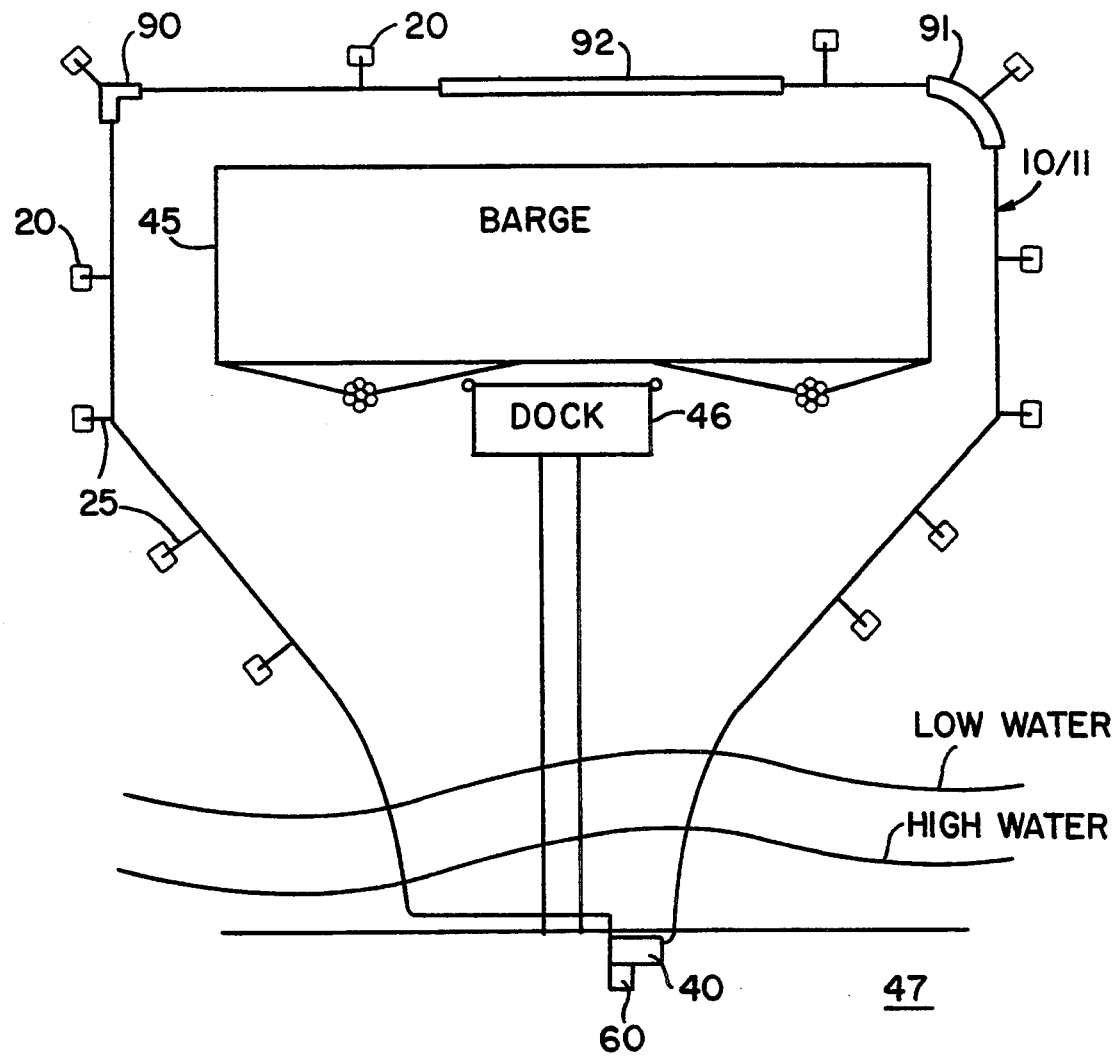
FIG. 7 is a schematic illustrated of a further embodiment of the invention.

In a modification of the invention, the semi-flexible pipe 10 may be replaced at one or more portions of the boom by a rigid pipe section, for example of galvanized steel. As illustrated in FIG. 7, for example, one or more corners of the boom may be formed of a right angle galvanized steel elbow 90, or a galvanized steel sweeper. Similarly, a straight section of the semi-flexible pipe 10 may be replaced by a straight section of a rigid pipe, such as a galvanized steel pipe 92. The skirt 11, as well as the ballast, extend in the region of the rigid sections 90, 91, 92.

The sections 90, 91, 92 provide additional rigidity to the boom, if necessary, as well as enabling the reduction of the number of anchors 20 that are necessary to anchor the boom. If additional weight is necessary in the sections 90, 91, 92, a ballast wire, such as a ⅛ inch diameter ballast wire, may be provided extending through the pipe sections 90, 91, 92.

Figure 8:
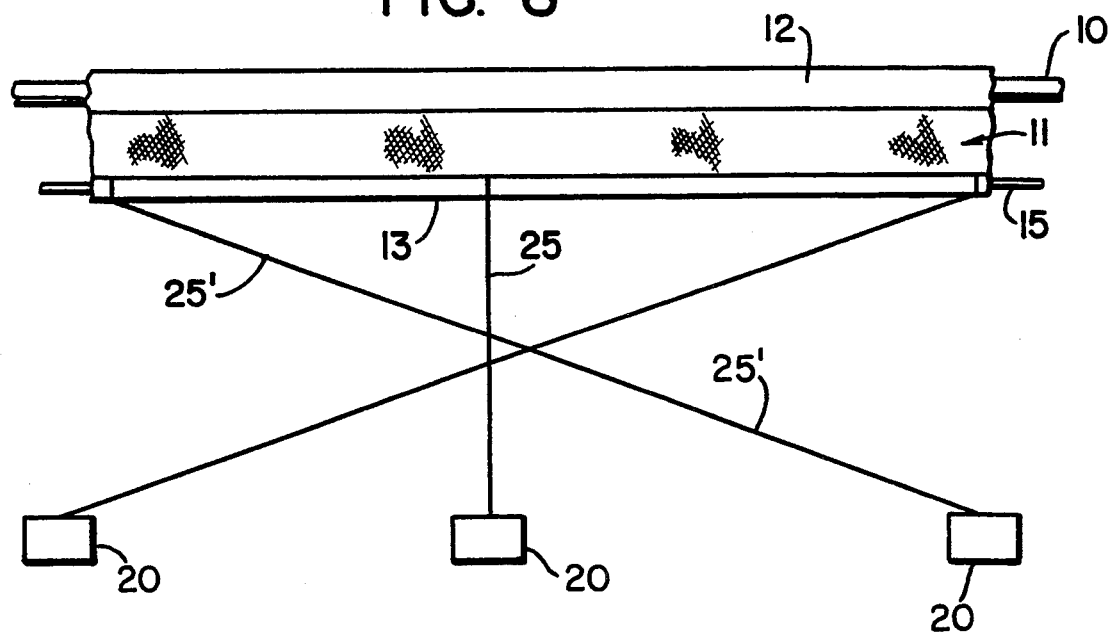
FIG. 8 illustrated a modified arrangement for anchoring the boom of the invention.

In a further embodiment of the invention, as illustrated in FIG. 8, it is advantageous to affix at least some of the cables 25' between the anchors 20 and the boom to positions that are displaced longitudinally of the boom from the respective anchor. For example, as illustrated, the cables 25' may have lengths exceeding the length required to extend directly to the boom when the boom is floating, and the cables 25' are affixed to the boom at locations such that these cables are substantially straight when the boom is floating. As a result, when the boom is lowered to the sea floor, it will remain generally extended, and not merely pile up at one location, as in the case of the shorter cables 25. The cables 25 and 25' may hence be arranged to cross one another, as illustrated.

Figure 9:
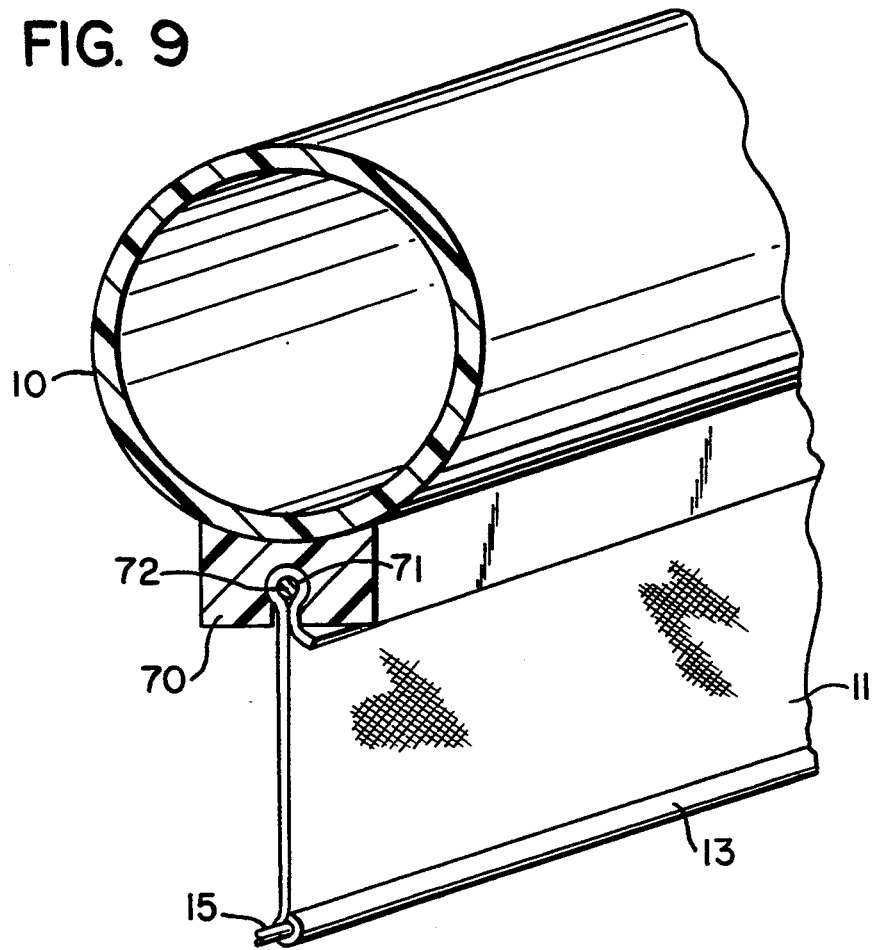
FIG. 9 is a cross sectional view of a portion of the boom, illustrating an alternative arrangement for connecting the pipe to the skirt thereof.

In order to reduce the amount of material that need be provided for the skirt, as illustrated in FIG. 9, a block 70, for example of polyethylene is affixed to the bottom of the pipe 10, for example with an adhesive. The block 70 extends along the pipe 10, at least for the portion thereof that is intended to support a skirt. The block 70 has a central channel 71 extending longitudinally therein. The upper edge of the skirt is fitted in the channel, and held therein by a rod 72, for example a round stock key, snapped into the channel from the slot at the bottom edge thereof, thereby to lock the top of the skirt in the block 70. With this arrangement it is thereby not necessary to extend the skirt fully around the pipe 10. Consequently, it is only necessary to hang the material and ballast wire that is needed below the water surface from the block.

In one embodiment of the invention, wherein the pipe 10 had a diameter of 8", the block 70 had a cross section of 2"×2" and the channel 71 had a diameter of 1".

Figure 10:
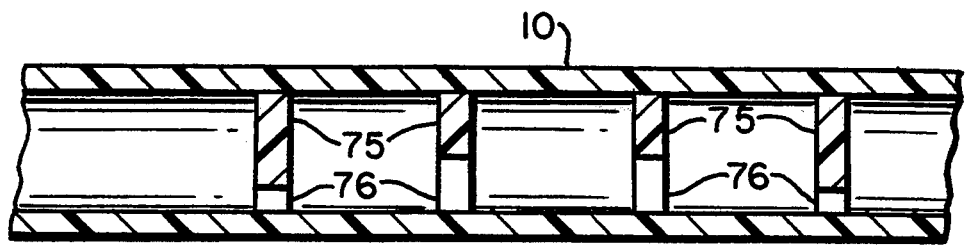
FIG. 10 is a cross sectional view of a portion of the boom, illustrating the use of bulkheads therein to control the sinking and raising of the boom.

In accordance with a further feature of the invention, it is desirable to be able to control the rate of sinking and surfacing of the boom. For this purpose, one or more bulkheads 75 may be fitted in the pipe 10, as illustrated in FIG. 10. The bulkheads may be of polyethylene or other material, and may be adhesively affixed to the interior of the pipe. They may have a thickness, for example only, of 2". The bulkheads have holes 76 extending therethrough, the diameters of the holes being selected to obtain the desired rate of passage of air and water therethrough. The bulkheads 75, instead of extending for the full height of the interior of the pipe 10, may alternatively extend for varying heights to serve the same function. It is of course apparent that the number of bulkheads 75 that are provided may be less or more than the four that are illustrated.

Figure 11:
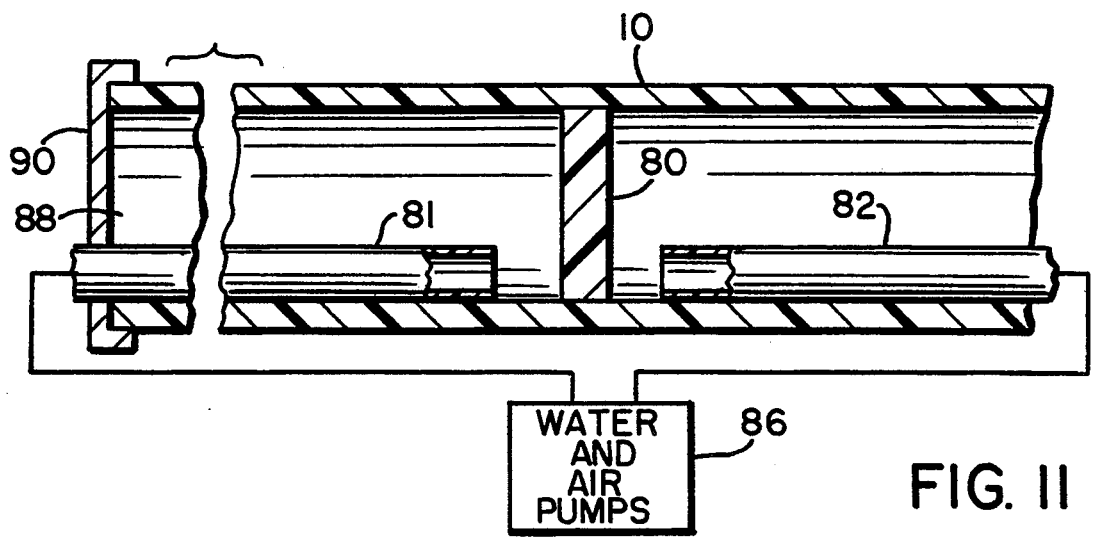
FIG. 11 is a partially cross sectional view of a portion of the boom, illustrating an arrangement enabling control of the position at which raising and lowering forces are initiated.

In accordance with a still further feature of the invention, as illustrated in FIG. 11, a bulkhead 80 is provided at a central location in the boom, to separate the boom into two chambers. This bulkhead may be of polyethylene or other conventional material, and may be adhesively affixed in the pipe 10.

Separate semi-flexible pipes 81, 82 extend into the pipe 10 from opposite ends thereof, and terminate in the vicinity of, i.e. spaced a short distance from, the bulkhead 80. In an example, if the pipe 10 has a diameter of 8", the pipes 81, 82 have diameters of 2".

The pipes 81, 82 extend completely through their respective ends of the pipe 10, which may be provided with end caps 90 as illustrated at the left side of FIG. 11, and are plumbed through the ends 88 of the pipe 10. The pipes 81, 82 are connected to the water and air pumps 86 at the fixed position on the shore or on a pier. In this embodiment of the invention, the capped ends of the pipe 10 may extend to the shore or pier, or they may terminate at a position in the body of water. Since, in the arrangement of FIG. 11, the water or air is pumped through the pipes 81, 82 to the center of the boom, relief valves (not shown) may be provided in the pipe 10 to enable removal of the water or air that has been displaced. Alternatively, additional flexible pipes (not shown) may be provided connected to the ends of the pipe in order to serve as a return path or vent port for displaced water or air, or the ends of the pipe 10 may be coupled to the water and air pumps to serve this function. Since the pipes 81, 82 are semi-flexible, and constitute a part of the boom, the boom will not be damaged by flexible bending while it is being floated or sunk.

The arrangement of FIG. 11 enables the air or water from the pumps 86 to be introduced at the center of the boom, i.e. adjacent the bulkhead 80, so that the boom advantageously starts to sink, and starts to raise, from a central position thereof. It is of course apparent that the bulkhead 80 may be positioned at any other desired location in the boom in order to obtain the optimum control over the sinking and raising thereof. The arrangement of FIG. 11 may also be provided with apertured bulkheads of the type illustrated in FIG. 10, to obtain further control over the sinking and raising of the boom.

Figure 12:
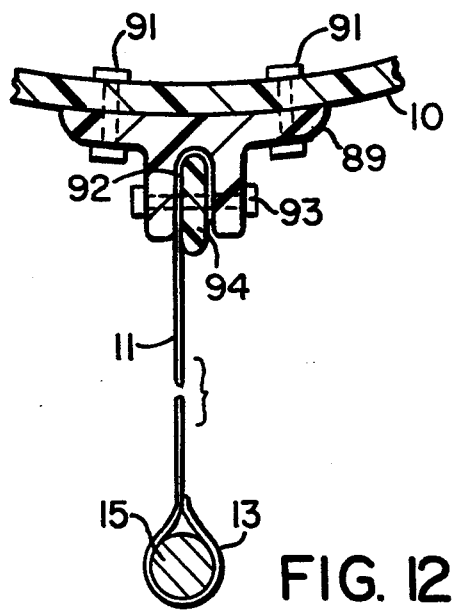
FIG. 12 is a cross sectional view of a portion of the boom showing a further arrangement for connecting the pipe to the skirt thereof.
Figure 13:
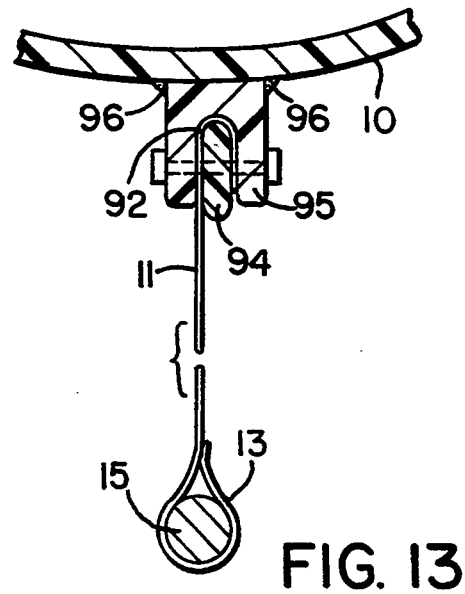
FIG. 13 is a cross sectional view of a portion of the boom showing a still further arrangement for connecting the pipe to the skirt thereof.

FIGS. 12 and 13 illustrate further arrangements for holding the skirt to the pipe, to reduce the amount of material employed for the skirt. As illustrated in FIG. 12, a track 89 is riveted to the pipe 10 by rivets 91, the skirt is held in the channel 92 of the track 89 by an insert 94, for example of polyethylene, and a machine bolt 93, for example of nylon, extends through the arms of the channel, the top of the skirt and the insert, to hold the skirt. In the modification of FIG. 13, a track 95 is held to the bottom of the pipe 10 by extrusion welds 96 extending along the upper edges of the track. As in the arrangement of FIG. 13, the upper edge of the skirt is held in the channel 92 of the block by an insert 94, and a nylon bolt 93 or the like extends through the arms of the channel, the upper edge of the skirt, and the insert, to hold the skirt to the pipe.

While the invention has been disclosed and described with reference to a limited number of embodiments, it will be apparent that variations and modification may be made therein, and it is therefore intended in the following claims to cover each such variation and modification as falls within the true spirit and scope of the invention.

What is claimed is:

1. A marine containment boom from a fixed position above a body of water to be selectively moved to first position wherein it extends continuously from the fixed position to have a portion of said boom resting on the floor of the body of water and to a second position wherein it extends continuously from the fixed position to a second position wherein said portion of said boom floats on the surface of the body of water, said boom comprising a length of pipe, a containment means supported by said pipe, said containment means including a skirt having a web provided with a continuous ballast at the free end of the web, at least one permanent anchor, a line for permanently coupling said anchor to said pipe, a source of compressed air, means for directing air from said source of compressed air into said pipe to cause said boom to have a positive buoyancy, said pipe being at least partly of a pipe of a semi-flexible material positioned in said boom to permit said boom to be flexibly bent during movement between said first and second positions from said fixed position to avoid damage due to flexing or bending when deployed continuously from said fixed position, and cable means for connecting said skirt to said anchor.

2. The marine containment boom of claim 1 further comprising means for selectively pumping water into said pipe from said fixed position.

3. The marine containment boom of claim 1 wherein said pipe of semi-flexible material is a length of a plastic pipe.

4. The marine containment boom of claim 3 wherein said plastic pipe is a polyethylene pipe.

5. The marine containment boom of claim 1 further comprising means at said fixed location for introducing water into said semi-flexible pipe for causing said boom to have negative buoyancy.

6. The marine containment boom of claim 1 wherein said containment means comprises a skirt, said skirt having ballast means along the entire periphery of the free end of the skirt.

7. A marine containment boom for deployment from the shore or a pier, comprising a length of a semi-flexible pipe, a skirt afixed to said pipe, said skirt being provided with a ballast means along the entire periphery of the free end thereof, and extending along said pipe, at least one permanent anchor, means for coupling said anchor to said skirt, said coupling means permitting said pipe to be spaced from said anchor by a predetermined range of distance, a source of compressed air at a fixed position on said shore or pier, and means directing air from said source of compressed air into said pipe to cause said boom to have positive buoyancy, said semi-flexible pipe being capable of unlimited bending to avoid being damaged when raising or lowering said boom.

8. The marine containment boom of claim 7 wherein said means for coupling said anchor to said pipe comprises a first line, and further comprising a second anchor coupled to said pipe via a second line, said first and second anchors being positioned at first and second spaced apart positions on the bottom of a body of water, said first and second lines having lengths greater than the distance from the respective anchor to the surface of the body of water and being coupled to said pipe at positions wherein the respective line is substantially straight when said pipe is located at said surface.

9. The marine containment boom of claim 8 wherein said first and second lines cross one another.

10. The marine containment boom of claim 7 further comprising means for introducing water into said semi-flexible pipe in order to cause said pipe to have negative buoyancy.

11. The marine containment boom of claim 7 wherein said semi-flexible pipe has a plurality of bulkheads therein, said bulkheads having apertures extending therethrough of varying cross section thereby separating the pipe into a plurality of chambers thus permitting the control of the rate of sinking or surfacing of the boom.

12. The marine containment boom of claim 7 wherein said semi-flexible pipe has a bulkhead extending therethrough and separating said semi-flexible pipe into two compartments, and wherein said means directing air into said semi-flexible pipe comprises first and second pipes extending from said source of air through said semi-flexible pipe and terminating adjacent said bulkhead and spaced therefrom.

13. The marine containment boom of claim 7 comprising means for affixing said skirt to said semi-flexible pipe, said means for affixing comprising a block extending along and affixed to an external surface of said semi-flexible pipe, an open channel extending along said block, said skirt having an upper edge in said channel, and a rod extending in said channel and locking said upper edge of said skirt therein.

14. A marine containment boom as claimed in claim 1 wherein the width of said skirt is between 12 and 18 inches.

15. A marine containment boom as claimed in claim 12 wherein said bulkhead is substantially centrally located in said boom and the pipe having negative buoyancy wherein air is introduced into said pipe adjacent to said bulkhead said pipe rises to the surface of the water from the central portion of said pipe.

* * * * *